United States Patent [19]

Wilson

[11] Patent Number: 4,580,529
[45] Date of Patent: Apr. 8, 1986

[54] FARM ANIMAL SPRAYING SYSTEM

[76] Inventor: Ginger T. Wilson, P.O. Box 58, Irvington, Ky. 40146

[21] Appl. No.: 548,915

[22] Filed: Nov. 7, 1983

[51] Int. Cl.$^4$ .............................................. A01K 29/00
[52] U.S. Cl. ........................................ 119/159; 119/62
[58] Field of Search ...................... 119/51.12, 51.5, 62, 119/159

[56] References Cited

U.S. PATENT DOCUMENTS

| | | | |
|---|---|---|---|
| 1,433,081 | 10/1922 | Kenyon | 119/159 X |
| 2,316,932 | 4/1943 | Bruce | 119/159 |
| 2,751,882 | 6/1956 | Coyner | 119/159 X |
| 2,933,063 | 4/1960 | Geerlings | 119/62 X |
| 3,032,011 | 8/1959 | Stramel | 119/159 |
| 3,870,023 | 3/1975 | Wilson | 119/159 |
| 4,165,715 | 8/1979 | Knapp | 119/159 |
| 4,459,942 | 7/1984 | Cauthron | 119/159 |

OTHER PUBLICATIONS

Stockman's National Supply, p. 68.

Primary Examiner—Robert P. Swiatek
Attorney, Agent, or Firm—King and Schickli

[57] ABSTRACT

A method and apparatus are provided for spraying farm animals, such as is utilized in treating cattle for face flies or the like. The apparatus includes a shed housing a feeder box. The lid of the feeder box is connected to a control circuit including a switch that activates a pump to spray the animal when the lid is closed. Passage in the shed is restricted to prevent the animal from turning around so that the spraying takes place as the animal backs from the shed. A reset timer is also provided to prevent system reactivation and assure that the animal is not oversprayed by continuously raising and lowering the feeder box lid. Additionally, circuitry for adjusting the duration of the spraying is also provided. The method involves the steps of attracting the animal into the shed, restricting the movement of the animal within the shed, activating a sprayer when the animal is done feeding and spraying the animal as it backs from the shed.

19 Claims, 7 Drawing Figures

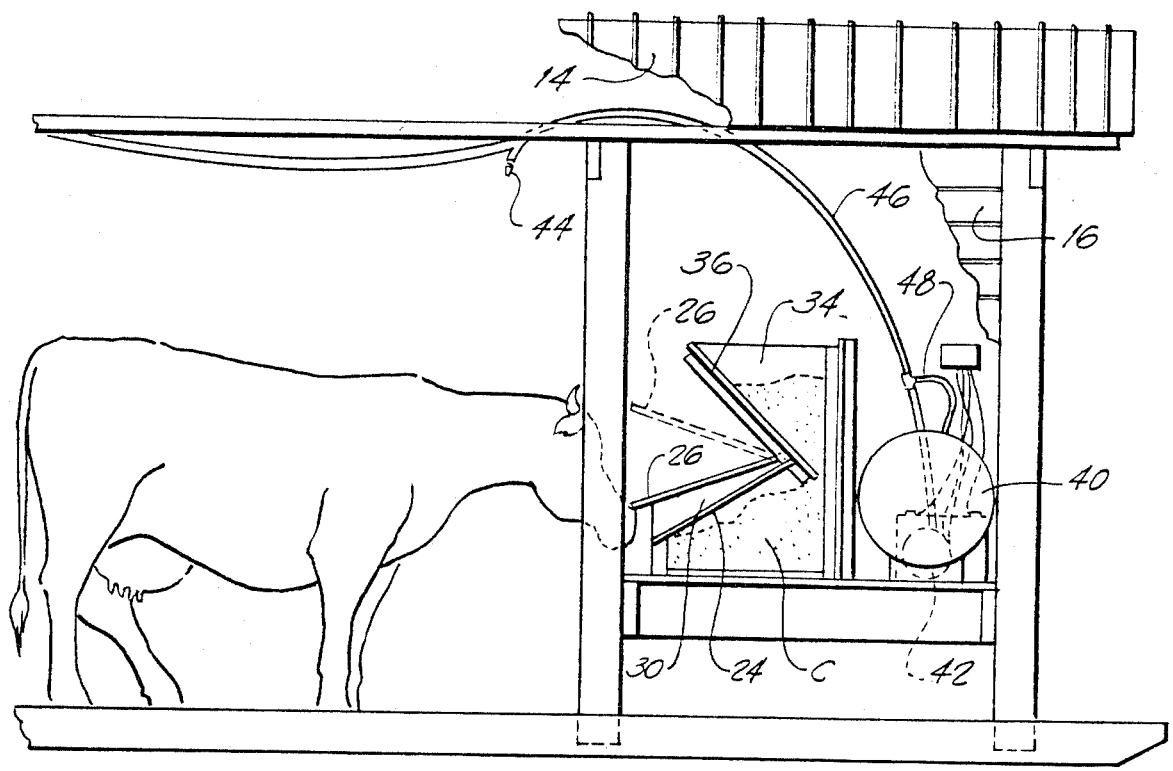
Fig. 2
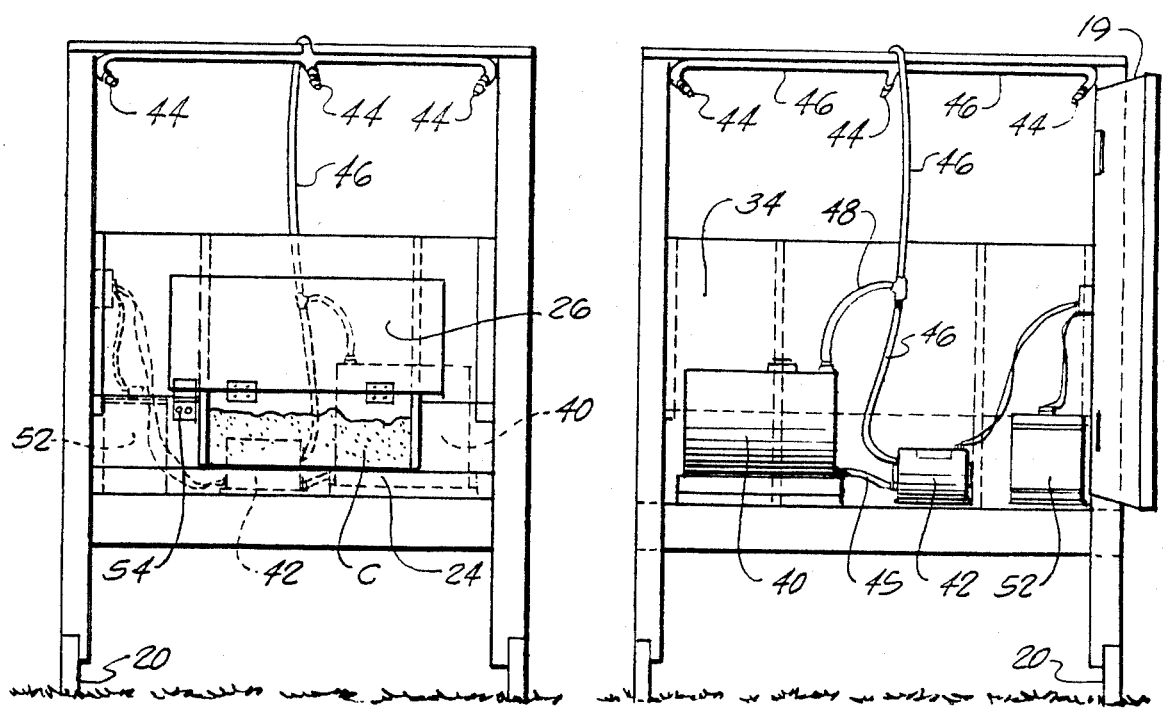
Fig. 3
Fig. 4

FARM ANIMAL SPRAYING SYSTEM

TECHNICAL FIELD

The present invention relates generally to the field of animal husbandry and, more particularly, to a method and apparatus for spraying farm animals as, for example, in controlling face flies on cattle.

BACKGROUND ART

Insect control is a major concern and problem in animal husbandry. For example, it is known that face flies contribute to weight loss and slow weight gain in cattle. Either of these problems, of course, delay the shipping of cattle to market and/or reduce the price received for the animals at slaughter, thereby resulting in unnecessary hardship for the farmer.

In response to the insect problem, insecticides and other substances have been developed for effectively treating animals and relieving them of pests. Difficulties arise, however, in the ease and thoroughness of treatment application. Additionally, the duration of treatment effectiveness is also a major concern. Finally, the man-hours of labor needed to treat the cattle with insecticides must be considered.

Attempts have been made in the prior art to overcome the above-identified difficulties. Specially treated ear tags have been developed to rid the animals of pests for the entire season. Unfortunately, however, the labor expense involved in tagging the animals is significant and the tags themselves are quite expensive. Further, tag effectiveness varies with time, as well as with the weather conditions. Also, the number of insecticides that are appropriate for use in these tags is limited and the insect population is already showing signs of developing resistance due to the sublethal dosages emitted by the tags.

Spray devices have also been developed for applying a uniform spray to the animals. Advantageously, the improved coverage provided by the spray furnishes a lethal dosage for combatting pests. Also, the insecticide may easily be varied to avoid resistance without the expense of retagging.

Initially, the cattle had to be herded or driven past an individual operating a manual sprayer. This type of operation, however, proved to be too labor intensive and costly. In order to overcome this problem, automatic sprayers have been developed, such as disclosed in U.S. Pat. NO. 3,032,011 to Stramel. In Strammel, the cow enters a stall of its own volition in order to feed from a box contained therein. When the cow lowers its head into the box, the head engages a switch that activates the spray jets that treat the cow.

The Stramel device, however, is not without its disadvantages. Since there is no enclosing structure, the spray is free to travel on the wind and blow into a neighboring field or pond, thereby causing possible contamination to the food or water supply. The wind, also, reduces the amount of spray and treatment actually reaching the animal possibly to sublethal levels. Additionally, the spray is free to contaminate the feed within the feed box of the Strammel apparatus. Further, there is no provision of a means for preventing the animal from being continuously sprayed should it move its head in and out of the feeder box as, for example, would occur in the situation where the animal scratches its chin or neck on the feeder box. This is because the scratching back-and-forth action of the animal's head would tend to engage the switch and activate the spray jets. In such an event, the animal could be dangerously oversprayed and the insecticide wasted. Also, the Strammel device is not readily transportable from field-to-field to meet the needs of the farmer.

Thus, a need is identified for a farm animal spraying system that provides greater effectiveness in combating pests while being more cost efficient and safer to the animal and the environment.

DISCLOSURE OF THE INVENTION

Accordingly, it is a primary object of the present invention to provide a farm animal spraying system and method providing improved spray coverage of the animal and effectiveness in combating pests.

It is another object of the present invention to provide a farm animal spraying system and method providing improved cost efficiency and safety for the animal as well as the environment.

A further object of the present invention is to provide a farm animal spraying system that prevents an animal from being oversprayed while retaining the spray within an enclosure to completely cover the animal and reduce environmental contamination.

Additional objects, advantages, and other novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved farm animal spraying system and method are provided for controlling pests on farm animals, such as face and horn flies on cattle. The system includes a shed providing a restricted passage allowing forward entry and backing exit of the animal. The shed is narrow enough to prevent the animal from turning around. This assures that the animal is well positioned for the spray to reach its head, thereby providing the maximum protection against face flies.

A feeder box is located within the shed so that the animals enter the shed of their own volition and any labor expense involved in herding the animals into the shed for spraying is avoided. As an added benefit, the feeder box may be filled with mineral, thereby assuring that the cattle enter the shed once every day or two. Thus, the animals are frequently treated and lower concentrations of insecticide may be used to obtain and retain a lethal dosage for combatting pests. This combination results in increased safety in treating the animals and improved pest control.

The feeder box includes a lid mounted for movement between an opened and closed position. When opened, the lid allows the animal to feed. When closed, the lid protects the contents of the feeder box from contamination by the spray while also providing a space or gap allowing the animal to investigate the contents of the box and to insert its nose to gain access.

Spraying means, such as a pump and a series of spray nozzles, are also provided. The nozzles are positioned about the shed to insure the complete coverage of the animal with the spray. The pump, spray nozzles and shed act together to create a mist or fog of solution that completely covers the animal, thereby providing the maximum protection from pests. This is particularly true where the shed is enclosed to prevent the scattering of the spray by the wind. The enclosure insures that more spray contacts and covers the animals while nearby fields and water supplies are protected from any contamination or other harmful effects.

The apparatus also includes control means. The control means are operative on the closing of the lid to activate the spraying means so as to spray the animal as the animal backs from the shed. More specifically, the control means includes a reset timing means that prevents reactivation of the spraying mechanism for a predetermined length of time following spraying. This improves safety by preventing an animal from being oversprayed in the event the animal continuously opens and closes the feeder box lid as, for example, could occur when the animal scratches its nose on the lid or investigates the feeder box contents.

Preferably, the feeder box is positioned in the shed opposite the doorway. The feeder box may also include an integral chute for filling the box with mineral or feed. A wall of the chute may also be angled toward the lid to prevent the lid from being opened over center by the animal during feeding. This insures the closing of the lid by gravity upon the completion of the feeding process and thus, the spraying of the animal as it backs from the shed.

The feeder box may also be inclined toward the animal to provide ease of access to the contents. The lid of the box is mounted to pivot upwardly and away from the head of the animal so as to prevent the head of the animal from catching in the box during feeding. This prevents injury to the animal and the possible damage to the apparatus that could be caused when an animal panics in just such a situation.

The access opening in the feeder box extends across the top and partially down the front wall. When closed, the lid covers the access opening along the top and hangs over the access opening in the front wall. The overhang of the lid and inclination of the feeder box aid in protecting the contents of the box from the spray, while the opening in the front wall allows the animal to investigate the contents and insert its nose to raise the lid and gain access.

Still more specifically, the control means includes a switch means engaged upon the closing of the feeder box lid to activate the spraying means as the animal backs from the shed. The control means also includes means for adjusting the duration of the spraying so as to enable the individual farmer to accurately set the spray coverage and dosage depending on the needs of the animals and the pest population at any particular time.

In a further aspect of the invention, in accordance with its objects and purposes, a method for the spraying of farm animals includes the steps of attracting the animal into the shed, restricting the movement of the animal in the shed, activating the spray means after the animal feeds and spraying the animal during backing from the shed. Preferably, the step of restricting involves the provision of a shed of such a width dimension that the animal cannot turn around and only forward entry and backing exit are allowed. The timing of the spraying step and the restricting of the animal to the backing exit insure that the face of the animal is sprayed and thus, maximum protection against face flies is achieved.

The method may also include the additional step of forming a mist within the shed. Advantageously, this mist settles over the entire animal and is not concentrated in only a few spots as with a direct spray. Therefore, maximum pest control is provided.

More specifically, the method may include the step of preventing the animal from being oversprayed. This may include the step of resetting the spray means for activation only after a predetermined length of time following the preceeding spraying step. Such a reseting step reduces the possibility of overtreating an animal and prevents the wasting of the spray.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and description will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 2 is a broken-away side elevational view of the farm animal spraying system of the present invention showing the feeder box, feeder box lid and spraying means;

FIG. 3 is a side elevational view of the present invention through the doorway of the shed;

FIG. 4 is a side elevational view of the present invention through the open access panel of the shed;

Reference will now be made in detail to the present preferred embodiment of the invention, an example of which is illustrated in the accompanying drawing.

BEST MODE OF CARRYING OUT THE INVENTION

Figure 1:
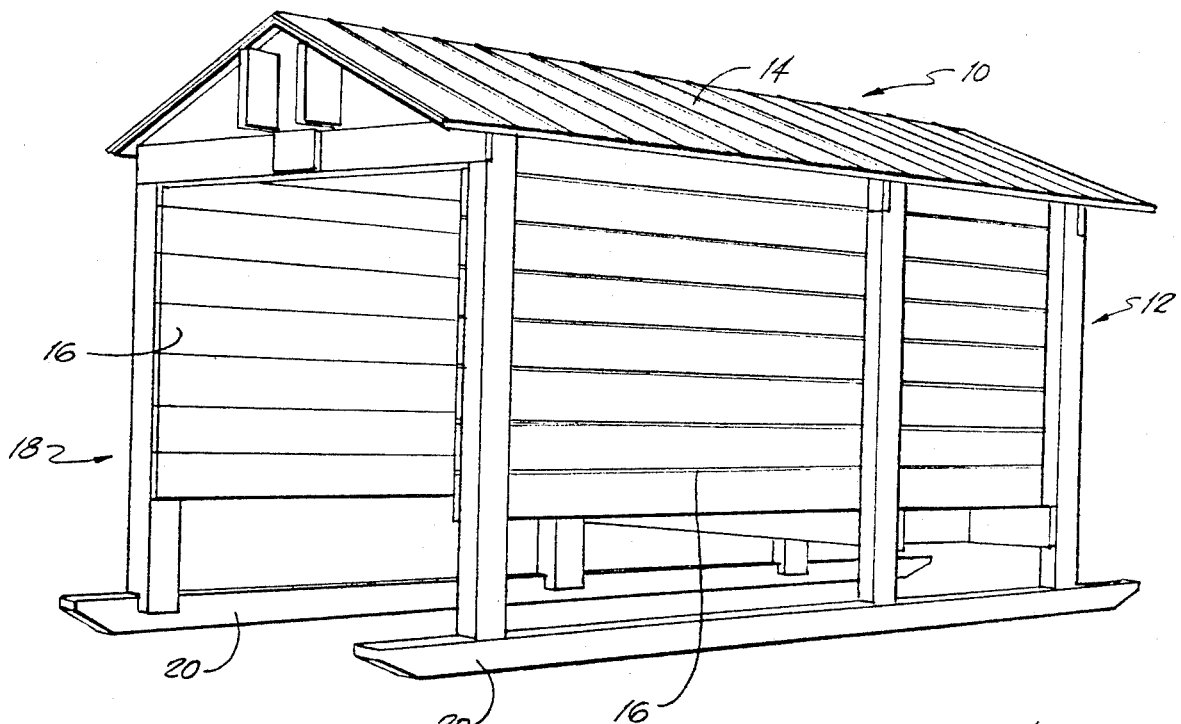
FIG. 1 is a perspective view of the farm animal spraying system of the present invention showing the shed enclosure.

Reference is now made to FIG. 1 showing the improved farm animal spraying system 10 of the present invention used, for example, in the treatment of cattle in order to control pests such as horn and face flies. The spraying system 10 includes a shed or enclosure 12 having a roof 14 and side walls 16 defining a doorway 18 at one end for the entry and exit of the animal. An access panel 19 is provided at the end of the shed 12 opposite the doorway 18 (see FIG. 1a). By opening the access panel 19, the operator gains access to the control and spraying means discussed below (see FIG. 4).

The shed 12 prevents the scattering of the spray by the wind, thereby protecting the environment and, more particularly, nearby fields of crops from contamination. Advantageously, the enclosed shed 12 also allows a mist rather than a direct spray to be used when treating the animal. The mist will not scare the animal like a direct spray and therefore, the animal will return to the shed to feed and consequently, receive further treatments.

It should also be appreciated that the shed 12 is of a width that provides a restricted passage for the animal that allows forward entry and backing exit but no turning around. This assures that the animal is consistently and properly positioned during spraying, thereby providing the maximum protection against face and horn flies.

As may further be appreciated from viewing FIG. 1, the shed 12 may be mounted on skids 20. This allows the shed 12 and farm animal spraying system 10 to be pulled by a tractor from field-to-field where needed. It, however, should be appreciated that a set of wheels or any other device allowing movement of the system 10 may be provided in accordance with the broadest aspects of the present invention.

Figure 1A:
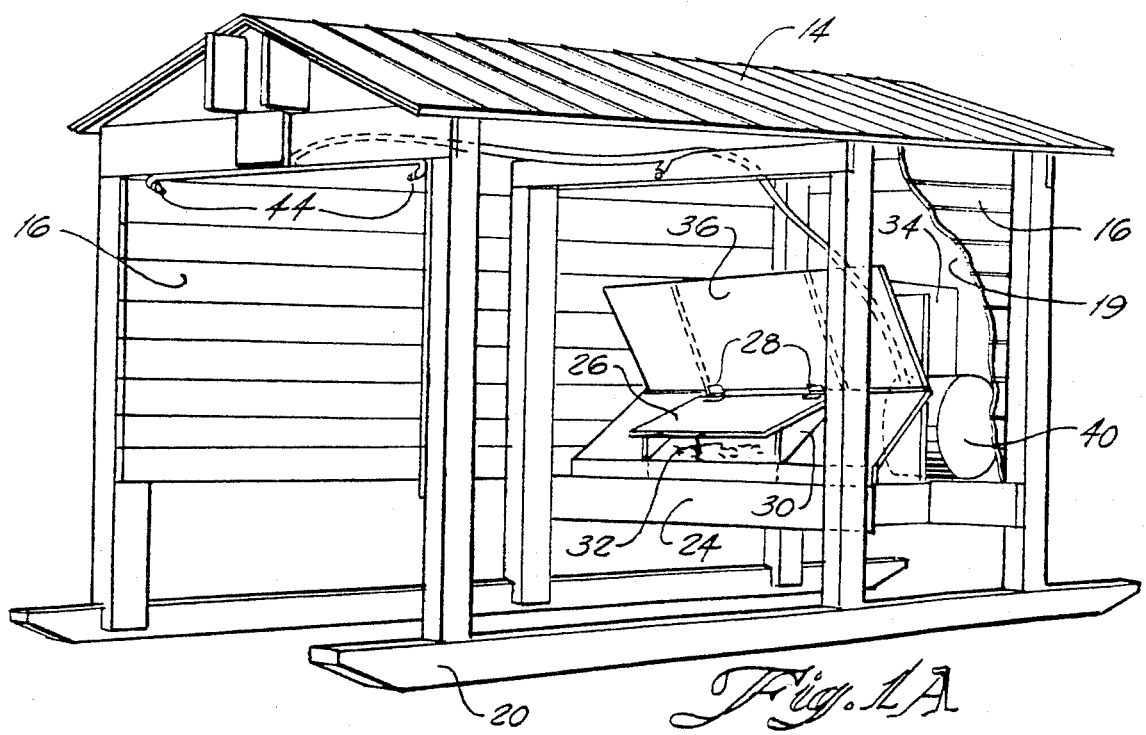
FIG. 1a is a broken-away view of FIG. 1 showing the feeder box within the shed.

As shown in breakaway in FIG. 1a, the shed 12 contains a feeder box 24 adjacent the end opposite the opening 18. This eliminates any need to herd the animals to the sprayer as they enter the shed 12 of their own volition every day or two in order to consume some mineral. Thus, with frequent treatment assured lower, safer concentrations of insecticides may be used in the spray.

The feeder box 24 may be inclined toward the animal for ease of access and includes a lid 26 pivotally mounted for movement by means of hinges 28 between an opened and a closed position. As shown in FIG. 1a and in solid line in FIG. 2, when closed the lid 26 rests upon side wall members 30 to cover the access opening in the top of the box 24 and prevent the animal from feeding. The side wall members 30, however, support the lid 26 to provide a gap or access opening 32 at the front of the feeder box 24. The opening 32 allows the animal to investigate the contents C of the box 24 and to insert its nose to gain access for feeding by raising the lid 26 upwardly and away as shown in phantom lines in FIG. 2. The pivotal opening of the lid 26 in this manner insures that the head and, more particularly, the ears of the animal do not catch in the box 24 during feeding. Therefore, injury to the animal and possible damage to the box 24 caused by the animal in an effort to free its head are avoided. Also, it should be appreciated that when closed the lid 26 extends beyond and hangs over the opening 32. This extension or overhang aids in preventing the contamination of the contents C of the box 24 by the spray.

The feeder box 24 may also include an integral chute 34 for ease of filling with feed or mineral (see FIG. 2). As shown, the front wall 36 of integral chute 34 extends at an angle toward the lid 26 to prevent the lid from being opened over center by the animal during feeding. This insures the proper closing of the lid 26 under the force of gravity when the animal is done feeding and thus, the spraying of the animal as it backs from the shed.

The spraying means of the present invention is best illustrated in FIGS. 2 and 4 and includes a storage tank 40, pump means 42 and spray nozzles 44. When activated, the pump means 42 pumps solution from tank 40 through line 45, up lines 46 to spray nozzles 44. Preferably, the nozzles 44 emit a fine mist or fog of solution that is sheltered from the wind by the shed 12 so as to completely cover the animal as it backs from the shed. As shown in the FIGS., the nozzles 44 are all positioned above the animal. It should be recognized, however, that the nozzles 44 may be positioned anywhere in the shed 12 so as to insure the complete coverage of the animal with the solution and the maximum pest protection.

As shown in FIG. 4, the spray means also includes a return line 48. Excess solution from pump means 42 returns to the tank 40 under pressure by way of line 48. This pressurized solution mixes the solution in the tank 40 to eliminate fluctuations in the concentration of insecticide. In addition to preventing the solution in tank 40 from stagnating, the mixing action provided by the return line 48 also reduces the possibility of a clog forming in the bottom of the tank.

Figure 5:
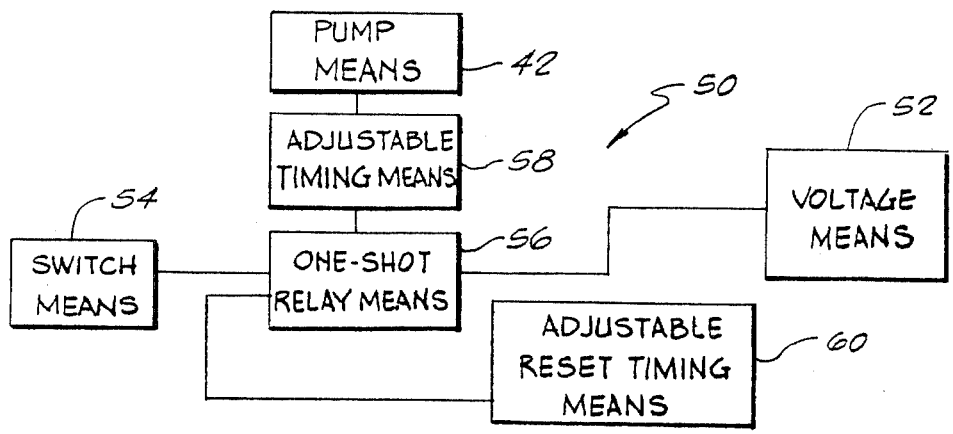
FIG. 5 is a schematic diagram of the electrical circuit of the present invention.

As seen from viewing FIG. 5, the farm animal spraying system 10 also includes a control means 50 that is operative on the closing of the lid 26 to activate the spraying means so as to spray the animal as it backs from the shed 12 following feeding. The control means 50 includes a voltage source 52, such as a battery for powering the pump means 42, and a switch means 54. Preferably, the switch means 54 is of the normally opened, momentary contact type. When the lid 26 is closed, the lid engages switch means 54 and actuates the switch to activate the one-shot relay means 56. The relay means 56 then activates the adjustable timing means 58 and pump means 42 to spray the animal for a predetermined length of time. Since the timing means 58 is adjustable, the dosage or coverage that the animal receives may be adjusted to conform to the severity of the pest problem.

Preferably, the control means 50 also includes an adjustable reset timing means 60 connected to the relay means 56. The reset timing means 60 resets the relay means 56 for operation only after a predetermined length of time, thereby providing a delay period during which reactivation of the pump means 42 is prevented. This delay prevents an animal from being oversprayed in the event the animal continuously opens and closes the lid 26 on feeder box 24 without moving from the shed 12. The length of the delay is adjustable and may be set to meet the requirements or preferences of the particular operator.

The method of the present invention includes the steps of attracting the animal into the shed 12, restricting the animal in the shed, activating the spraying means after the animal feeds, and spraying the animal as it backs from the shed.

Figure 6:
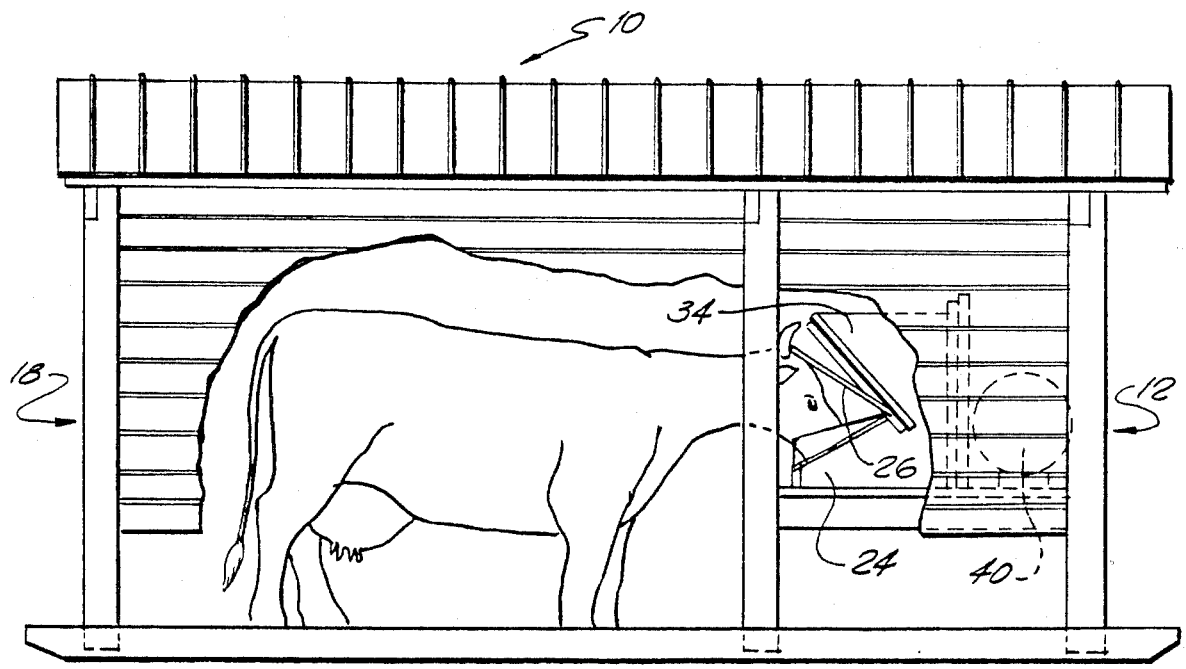
FIG. 6 is an additional side elevational view of the present invention showing a cow completely within the shed.

As previously indicated, the animal is attracted into the shed 12 by the provision of mineral or feed within feed box 24. Since the box 24 is located in the shed 12 at the end opposite the doorway 18, the animal must completely enter the shed to feed (see FIG. 6). Further, the movement of the animal within the shed 12 is restricted by the width of the shed. Therefore, the animal cannot turn around but, instead, must back from the shed following feeding. This assures slow movement and proper positioning of the animal during spraying, thereby providing the optimum spray coverage of the animal and maximum pest protection.

As should be appreciated, the spray means is activated when the lid 26 is returned to the closed position following feeding. The closing of the lid 26 activates switch means 54 of control means 50. This, in turn, activates the relay means 56, the timing means 58 and the pump means 42 to spray the animal as it slowly backs from the shed 12 following feeding.

The method may also include the step of forming a mist within the shed 12 so as to completely cover the animal. This step is made possible by the enclosed nature of the shed 12 that prevents the wind from scattering the mist and depositing it on adjacent fields rather than the animal. Advantageously, the mist settles over the entire body of the animal for maximum pest control and is not concentrated in only a few spots as with the application of a direct spray in the prior art devices. Further, the mist will not scare the animal as is possible with a direct spray. Therefore, the animal will return to the shed 12 to feed and also receive further treatments when mineral is desired.

Preferably, the method also includes the step of preventing the animal from being oversprayed. This is achieved by the operation of the adjustable reset timing means 60. The reset timing means 60 resets the relay means 56 so that the spray means may only be activated after a predetermined length of time following the previous spraying step, thereby insuring that an animal continuously opening and closing the lid 26 is not oversprayed.

In summary, numerous benefits have been described which result from employing the concepts of the invention. The farm animal spraying system 10 provides improved effectiveness in combating pests through the creation of a mist, protected from the scattering effects of the wind, that settles over the entire animal, not just on the areas that are directly sprayed as in the prior art. Further, the positioning of the animal and its movement through the mist are controlled by the restricted nature of the passage within the shed 12. Thus, optimum spray coverage and maximum pest protection are assured. Additionally, the present invention includes a reset timing means 60 that prevents the overspraying of an animal and reduces wasteful spraying in the event the animal continuously opens and closes the feeder box lid 26.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth of which they are fairly, legally and equitably entitled.

I claim:

1. A farm animal sprayer system, comprising:
    a shed to prevent redirection of the spray by the wind having a doorway at one end and a restricted passage for forward entry of the animal and backing from the shed;
    a feeder box located within said shed and having an access opening;
    a lid for said feeder box, said lid being mounted for movement between opened and closed positions; when opened said lid allowing the animal to feed and when closed said lid covering the access opening sufficiently to prevent the animal from feeding but allowing the animal to investigate the contents of the box and to insert its nose to gain access;
    spraying means; and
    control means operative on the closing of said lid to activate said spraying means so as to consistently spray the animal including the head and face of the animal when backing from the shed after feeding, thereby assuring the return of the animal to the shed.

2. The farm animal sprayer system disclosed in claim 1, wherein said control means further comprises a reset timing means preventing reactivation of the spraying means for a predetermined length of time so as to assure that an animal is not oversprayed by continuously opening and closing said lid.

3. The farm animal sprayer system disclosed in claim 2, wherein said reset timing means is adjustable.

4. The farm animal sprayer system disclosed in claim 1, wherein said feeder box is positioned within said shed opposite the doorway.

5. The farm animal sprayer system disclosed in claim 1, wherein said feeder box includes an integral chute for filling said box.

6. The farm animal sprayer system disclosed in claim 5, wherein a wall of said chute is angled over center toward said lid so as to assure closing of said lid when the animal completes the feeding step.

7. The farm animal sprayer system disclosed in claim 1, wherein said feeder box is inclined toward said animal for ease of access.

8. The farm animal sprayer system disclosed in claim 1, wherein said lid is pivotally mounted to prevent the head of the animal from catching in the box during feeding.

9. The farm animal sprayer system disclosed in claim 8, wherein said lid pivots upwardly and away from the head of the animal.

10. The farm animal sprayer system disclosed in claim 1, wherein the access opening is located across the top and front walls of said feeder box; when closed said lid covers the access opening across the top wall and extends beyond and hangs over the access opening in said front wall.

11. The farm animal sprayer system disclosed in claim 1, wherein said control means includes a switch means actuated by said lid.

12. The farm animal sprayer system disclosed in claim 1, wherein said control means includes means for adjusting the duration of the spraying.

13. The farm animal sprayer system disclosed in claim 1, wherein said spray means includes a pump and a series of spray nozzles positioned about said shed so as to form a mist to cover the animal.

14. The farm animal sprayer system disclosed in claim 1, wherein said shed is enclosed to allow full entry of the animal and prevent the scattering of the spray by the wind, thereby improving spray coverage of the animal.

15. A method for spraying farm animals, comprising the step of:
    attracting the animal into a shed that prevents redirection of the spray by the wind:
    restricting movement of the animal in the shed so as to prevent turning and only allow forward entry and backing exit;
    activating a spray means only after the animal feeds upon the closing of a lid on a feeder box in the shed so as to assure the return of the animal to the shed;

and spraying the animal during backing from the shed, thereby insuring coverage of the face of the animal with the spray.

16. The method disclosed in claim 15, comprising the additional step of forming a mist within the shed that protects the mist from the wind so as to completely and consistently cover the animal with an insect lethal dosage of insecticide.

17. The method disclosed in claim 15, comprising the additional step of preventing the animal from being oversprayed.

18. The method disclosed in claim 17, wherein said step of preventing includes the step of resetting the spray means for activation only after a predetermined length of time following and spraying step.

19. The method disclosed in claim 15, wherein is further provided the step of agitating the spray solution in the tank during the spraying step.

* * * * *